United States Patent

Kopeika

[11] 4,020,786
[45] May 3, 1977

[54] BALLOON SIGNAL ASSEMBLY

[76] Inventor: Saul Z. Kopeika, 310 Concord Road, Aston, Pa. 19014

[22] Filed: Dec. 24, 1975

[21] Appl. No.: 644,029

[52] U.S. Cl. .................... 116/124 B; 116/DIG. 9
[51] Int. Cl.² ............................................ B64B 1/52
[58] Field of Search ............... 116/124 B, DIG. 9; 9/9; 46/90

[56] References Cited

UNITED STATES PATENTS 3,938,466  2/1966  Crissman .................. 116/124 B

FOREIGN PATENTS OR APPLICATIONS 1,344,133  10/1963  France ..................... 116/124 B Primary Examiner—James J. Gill
Assistant Examiner—Anthony V. Ciarlante
Attorney, Agent, or Firm—Nelson E. Kimmelman; Allan Ratner; Paul Maleson

[57] ABSTRACT

The signal assembly includes a deflated balloon capable of retaining a lighter-than-air gas. It also includes a container for the gas under pressure which has an opening in it. The open edges of the balloon in deflated form are sealingly fixed to the opening. The balloon is retained in deflated form within the container by means of a lid or cap for the container which prevents outward movement of the balloon through the opening which would be necessary to inflate the balloon. The lid is normally attached to the container in a way sufficient to prevent escape of its contents except when the assembly is to be actuated. In one form of the invention, the balloon is disposed and retained in deflated form toward the open top of a rigid container having a lid that is tightly fitted around the upper edge of the container. The lid is equipped with a ring pull enabling the finger of the operator to pull the lid off thereby allowing the gas contents to move upward and out of the container due to inflation of the balloon by the gas pressure so that it extends outside the container in inflated form. In another form, the edge of the balloon is sealed to the inner top edge of the container in deflated form and a lid is tightly fitted around the upper edge. A flexible strip extends down the side of the container and is connected at its upper end to the lid. It is adhered to the side of the container and has a free lower edge which may be grasped by the operator and pulled outwardly and upwardly thereby dislodging the lid and allowing the gas within to push upward through the flexible balloon walls thereby forcing the balloon outwardly and inflating it. A tether line may be secured to the container and a fixed ground point.

11 Claims, 6 Drawing Figures

BALLOON SIGNAL ASSEMBLY

BACKGROUND OF THE INVENTION

1. Field of the Invention

This invention relates to a balloon signal assembly in which a deflated balloon is contained within a rigid sealed container having no valves and which may be actuated by an operator by simply unsealing the container.

2. Prior Art

There have been a number of forms of signal assemblies which include a balloon, a container of lighter-than-air gas attached or attachable to the balloon for inflating it which is made of a substantially rigid material, and a line which tethers it to a person or thing on the ground. Those assemblies are useful as emergency signals for downed pilots, people lost in forests or jungles, or for enabling radar to have a locating target. Usually there is provided a relatively complicated mechanism for breaking a seal that ordinarily prevents escape of the gas from the container into the balloon. They involve relatively complicated valve stem apparatus or a revolvable handle or several revolvable knurled nuts or require other screwing action. The mechanism and method for breaking the seal is often of such complexity that at a moment of trauma, which is when the device is usually used, the victim or operator may not easily operate the device because of his or her confused mental state. Also, it would be useful for children or those not speaking the language of instructions accompanying the signal assembly to employ a device of this type which by a simple manual movement dislodges the lid of the container of the compressed gas thereby allowing the gas to force the balloon outwardly and upwardly while inflating it. It is therefore among the objects of the present invention to provide a very simple balloon signal assembly having a direct and relatively fool-proof method for activating it. It is also among the objects of the present invention to provide a balloon signal assembly which is inexpensive to manufacture and, therefore, can be sold at a much lower price than has hitherto been the case.

BRIEF SUMMARY OF THE INVENTION

A signal assembly which includes a container having an opening and in which a pressurized lighter-than-air gas is inserted. A deflated balloon or other inflatable means is disposed in the container so as to close off the opening. A pressure-resistant cap or lid is associated with the container opening to keep the balloon therein. The cap is provided with means for manually detaching it from the container opening thereby allowing the pressurized gas to move outwardly from the container forcing part of the balloon outwardly through the opening and inflating it.

DETAILED DESCRIPTION OF THE DRAWINGS

Figure 1:
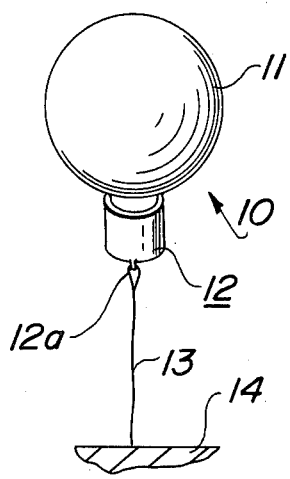
FIG. 1 is a perspective view of the signal assembly according to the present invention.

Referring to FIG. 1, one form of the novel balloon assembly is indicated generally at the numeral 10 comprising a balloon 11 shown in inflated form attached to the opening in a relatively rigid or pressure-resistant container 12 and a tether or line 13 attached to it and to a fixed anchoring object indicated by the numeral 14.

Figure 2:
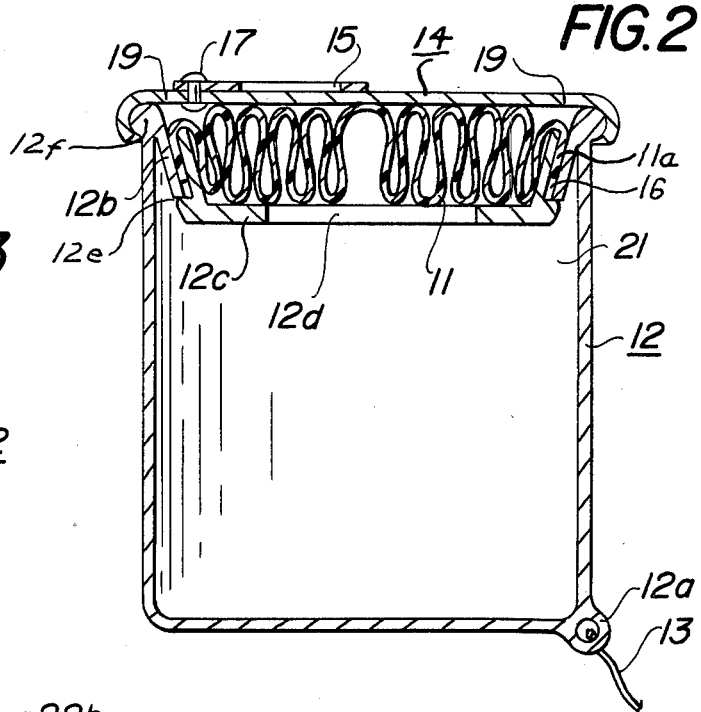
FIG. 2 is a sectional elevation view of one form of the present invention.
Figure 3:
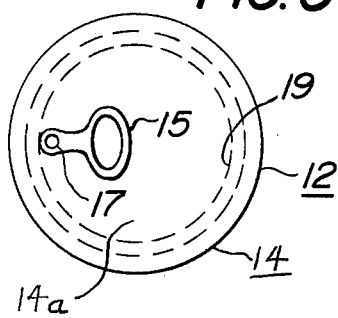
FIG. 3 is a plan view of the form of the invention shown in FIG. 2.

Referring to FIG. 2, the container 12 may be cylindrical or have any other appropriate cross-section and is made of an appropriate metal, rigid plastic or other material. Attached to its base is a tab to which a tether line 13 may be connected. There is a top opening surrounded by a reenforced edge portion 12b which extends downward into the container.

A deflated balloon folded in generally concentric folds as shown has its open end edge 11a folded around the upper edge of a generally annular member 12c made of a material such as metal or plastic. The balloon edge 11a is adhesively connected to the portion 12c and to the upper edge. If desired, additional adhesive may be inserted in the annular space 16 to help keep the cup 12c in a fixed position. The retaining cup 12c also has a lower shoulder portion 12e that abuts the lower edge of portion 12b. The cup 12c has a lower central circular opening 12d and helps to support and retain the folded balloon 11 in the general area just below the lid of the container.

The container is also equipped with a cap or lid 14 which may be of metal, for example, that is capable of withstanding the outward pressure of the gas compressed within the interior. The lid is permanently fastened, as by soldering, to the upper edge 12f at all points. It has a pre-weakened or scored line 19 defining a central circular portion 14a that is ultimately removed when the device is actuated. A ring pull 15 is attached to the region 14a by a rivet 17 or other appropriate means to enable the user to remove the region 14a by an upward and rearward (relative to the pull 12f) pull on the ring 12f. When this is done, the outward pressure on the balloon 11, formerly restrained by the lid 14, forces the balloon upwardly and outwardly through the opening left by the removed portion 14a and inflates it.

Figure 4:
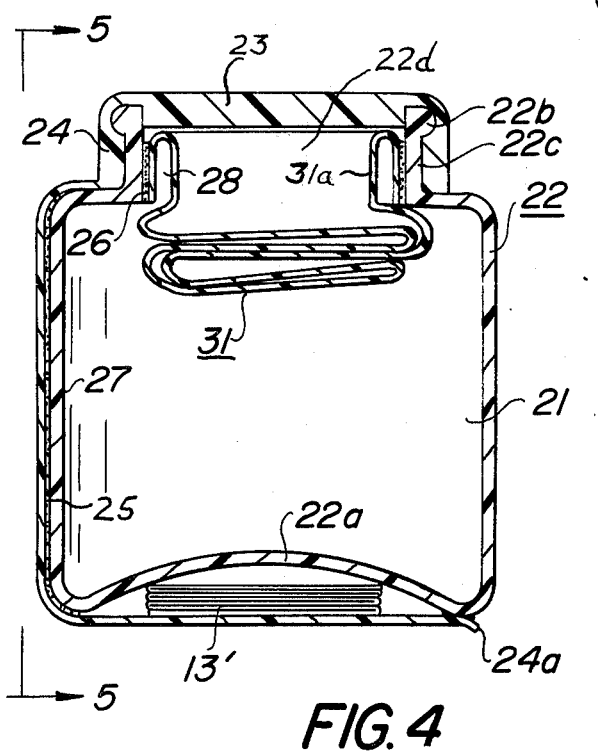
FIG. 4 is a sectional elevation view of another form of the present invention.
Figure 5:
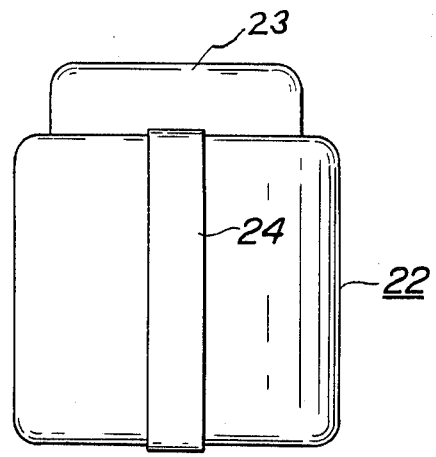
FIG. 5 is a side view of the invention as viewed from the line 5—5 in FIG. 4 in the direction indicated.

FIGS. 4 and 5 show still another form of the invention in which there is a container 22 made of the same or similar material as container 12 and has a base 22a which is concave. It also has an opening 22d formed in the neck portion 22c. To the inner annular surface of the neck 22c the outer surface of the open end portion 31a of the deflated balloon 31 is adhered by an appropriate adhesive indicated at the numeral 26. The container is sealed by a cap or lid 23 fixed to the upper edge portion 22b by a gas-tight adhesive or by light soldering, for example. It provides a rigid barrier to restrain the folded balloon 31 and prevent it from being inflated. Instead of the pull ring 15 in the embodiment of FIG. 2, a flexible strip portion 24 formed integrally with the cap 23 or fixed thereto runs down the side of the container 20 and under the base 20a for a short distance, as shown, to enable the operator to grasp hold of its end with the fingers. In order to retain the strip 24 close to the side wall of the container 20, a light adhesive material 25 may be attached to the inner surface of the strip 24 and to the outer surface of the wall of the container 21. The lower portion of the strip 24 is bent under the concave bottom 22a and its end 24a is lightly cemented or adhered to the container 21 so as to retain the coiled tether line 13' against the bottom. In operation, the user will grasp the end of the strip 24 and pull it downward, then upward and away from the container 21 until the cap or lid 23 becomes dislodged. Since there no longer is a restraining barrier, the internal gas pressure within the container 21 will then force the folded balloon 31 upward and outward through the opening 22a and inflate it.

Figure 6:
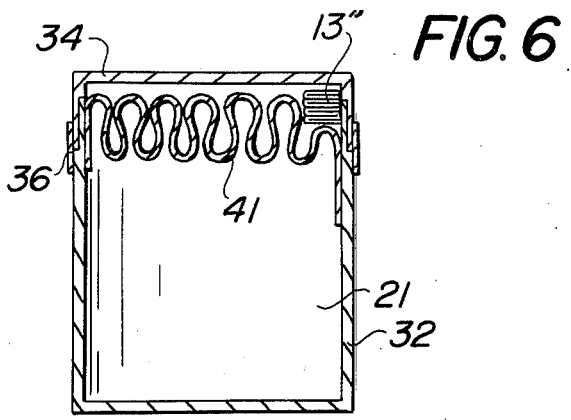
FIG. 6 is a sectional elevation view of another form of the present invention.

FIG. 6 shows still another form of the invention in which there is a container 32 made of metal, plastic or other relatively rigid pressure-resistant material. At its top a folded balloon 41 has its open end adhered to the inner surface of its upper edge. A tether line 13" is lodged above the balloon below the lid 34 and has one of its ends fixed to the container. A cap 34 fits on the top of the container 32 and is secured adhesively to the container by a tape 36. The adhesive and the cap must be strong enough to prevent escape of pressurized gas from the interior 21.

Of course, other ways of providing a barrier preventing ejection and inflation of the balloon may be used, such as a twist-off cap of the type associated with containers. In that case, the neck of the container would have threads which engage corresponding threads in the twist-off cap. The ends of the balloon could, as in FIG. 4, be adhesively secured to the inner surface of the neck. Upon twisting of the cap and its removal, the internal gas pressure would force the balloon outward and inflate it the same time. Also, as in FIG. 4, a provision such as the tab with a hole in it could be used to attach a tether thereto.

Still other forms of the invention, which do not depart from the essence thereof, will occur to those skilled in the art upon purusal of the present specification, drawings and claims. Therefore, I desire my invention to be limited solely by the claims which follow:

I claim:
1. A signal assembly comprising:
 a. an inflatable means capable of retaining a lighter-than-air gas,
 b. container means which contains said gas and in which said inflatable means is disposed in substantially deflated condition and has an open terminal portion fixed thereto whereby the interior of said inflatable means is always in communication with said gas, said container means including movable wall means which normally prevents said gas and inflatable means for escaping said container means, said movable wall means being adapted to be manually dislodged whereupon the pressurized gas within said container forces the unrestrained parts of said inflatable means out of said container means.

2. The signal assembly according to claim 1 with the addition of attaching means to which a tether line may be connected.

3. The signal assembly according to claim 2 with the addition of a tether line affixed to said attaching means.

4. The signal assembly according to claim 1 wherein said container includes therein means to retain said deflated inflatable means in the vicinity of said movable wall means.

5. The signal assembly according to claim 1 wherein said inflatable means is disposed in said container in a number of generally concentric folds.

6. The signal assembly according to claim 2 wherein said container means has a recessed base portion into which said tether line is placed.

7. The signal assembly according to claim 1 wherein said container comprises a top fixed at its edges around the upper part of said container and said movable wall means is a central, detachable portion of said top provided with means associated therewith for manually detaching said central portion from said top and further wherein said open terminal portion of said inflatable means is secured to said container in the vicinity of said top.

8. The signal assembly according to claim 1 wherein said container has an opening therein to which said deflated inflatable means has its open terminal portion sealingly attached and wherein said opening is normally sealed by a lid releasably secured thereto, said lid being provided with an elongated means attached to it that may be manually moved to dislodge said lid from said container.

9. The signal assembly according to claim 8 wherein said elongated means is a strip attached to said lid and adhered to the side of said container.

10. The signal assembly according to claim 9 wherein said container has a concave bottom in which a tether connected to said container is lodged and retained in place by said strip which also traverses said bottom and is adhered thereto.

11. The signal assembly according to claim 1 wherein said removable means comprises a top portion snugly fitted to said container and which is retained in gas-sealing relation thereto by a flexible strip covering the junction of the top portion and said container, said strip being secured to said top portion and said container but releasably manually therefrom.

* * * * *